US012784286B2

(12) United States Patent
Huang et al.

(10) Patent No.: US 12,784,286 B2
(45) Date of Patent: Nov. 3, 2026

(54) EFFICIENT CODING OF ATTRIBUTE CONNECTIVITY OF POLYGON MESHES

(71) Applicant: Tencent America LLC, Palo Alto, CA (US)

(72) Inventors: Chao Huang, Palo Alto, CA (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 150 days.

(21) Appl. No.: 19/018,824

(22) Filed: Jan. 13, 2025

(65) Prior Publication Data

US 2025/0232479 A1 Jul. 17, 2025

Related U.S. Application Data

(60) Provisional application No. 63/621,543, filed on Jan. 16, 2024.

(51) Int. Cl.
*G06T 9/00* (2006.01)
*G06T 17/20* (2006.01)

(52) U.S. Cl.
CPC .............. *G06T 9/001* (2013.01); *G06T 17/20* (2013.01)

(58) Field of Classification Search
CPC ................................ G06T 9/001; G06T 17/20
See application file for complete search history.

(56) References Cited

U.S. PATENT DOCUMENTS 6,262,737 B1 * 7/2001 Li ........................... G06T 17/20 375/E7.092
7,098,916 B1 * 8/2006 Khodakovsky ......... G06T 9/001 382/241
2022/0020211 A1 * 1/2022 Vytyaz .................... G06T 17/20
2024/0153150 A1 * 5/2024 Kim ..................... H04N 19/597
2024/0420376 A1 * 12/2024 Zakharchenko ........ G06T 17/00
2025/0166232 A1 * 5/2025 Hayashi .................. G06T 9/001

FOREIGN PATENT DOCUMENTS

WO WO-2025084224 A1 * 4/2025 ............... G06T 9/00

OTHER PUBLICATIONS

Peng, Jingliang, et al. "Technologies for 3D Mesh Compression: A Survey." Journal of Visual Communication and Image Representation, vol. 16, No. 6, Dec 2005, pp. 688-733, https://doi.org/10.1016/j.jvcir.2005.03.001 (Year: 2005).*

(Continued)

*Primary Examiner* — Said Broome
*Assistant Examiner* — Amelia Velazquez Valencia
(74) *Attorney, Agent, or Firm* — ArentFox Schiff LLP

(57) ABSTRACT

A bitstream that includes coded information of a mesh with position vertices and non-position vertices is received. The coded information indicates whether a cut is applied to connections of the position vertices of the mesh. Whether the cut is applied is based on a comparison between a total number of the position vertices of the mesh and a total number of the non-position vertices of the mesh. The position vertices of the mesh are processed when the coded information indicates that the cut is applied to the connections of the position vertices of the mesh. The mesh is reconstructed based on whether the position vertices are processed.

20 Claims, 7 Drawing Sheets

(56) References Cited

OTHER PUBLICATIONS

Isenburg, Martin. "Compressing Polygon Mesh Connectivity with Degree Duality Prediction." Graphics Interface, Jan. 2002, pp. 161-170, https://doi.org/10.20380/gi2002.19 (Year: 2002).*

Khodakovsky, Andrei, et al. "Near-Optimal Connectivity Encoding of 2-Manifold Polygon Meshes." Graphical Models, vol. 64, No. 3-4, May 2002, pp. 147-168, https://doi.org/10.1006/gmod.2002.0575 (Year: 2002).*

* cited by examiner

EFFICIENT CODING OF ATTRIBUTE CONNECTIVITY OF POLYGON MESHES

INCORPORATION BY REFERENCE

The present application claims the benefit of priority to U.S. Provisional Application No. 63/621,543, "EFFICIENT CODING OF ATTRIBUTE CONNECTIVITY OF POLYGON MESHES" filed on Jan. 16, 2024, which is incorporated by reference herein in its entirety.

TECHNICAL FIELD

The present disclosure describes aspects generally related to mesh coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include bitstreams, methods, and apparatuses for mesh encoding/decoding. In some examples, an apparatus for mesh encoding/decoding includes processing circuitry.

According to an aspect of the disclosure, a method of mesh decoding is provided. A bitstream that includes coded information of a mesh with position vertices and non-position vertices is received. The coded information indicates whether a cut is applied to connections of the position vertices of the mesh. Whether the cut is applied is based on a comparison between a total number of the position vertices of the mesh and a total number of the non-position vertices of the mesh. The position vertices of the mesh are processed when the coded information indicates that the cut is applied to the connections of the position vertices of the mesh. The mesh is reconstructed based on whether the position vertices are processed.

According to another aspect of the disclosure, a method of mesh encoding is provided. Whether a cut is applied to connections of position vertices of a mesh is determined based on a comparison between a total number of the position vertices of the mesh and a total number of non-position vertices of the mesh. The position vertices of the mesh are processed when the cut is determined to be applied to the connections of the position vertices of the mesh. Syntax information is encoded into a bitstream. The syntax information indicates whether the cut is applied to the connections of the position vertices of the mesh.

According to yet another aspect of the disclosure, a method of processing mesh data is provided. In the method, a bitstream of mesh data is processed according to a format rule. In an example, the bitstream includes coded information of a mesh with position vertices and non-position vertices. The coded information indicates whether a cut is applied to connections of the position vertices of the mesh. Whether the cut is applied is based on a comparison between a total number of the position vertices of the mesh and a total number of the non-position vertices of the mesh. The format rule specifies that the position vertices of the mesh are processed when the coded information indicates that the cut is applied to the connections of the position vertices of the mesh. The format rule specifies that the mesh is processed based on whether the position vertices are processed.

Aspects of the disclosure also provide an apparatus for mesh decoding. The apparatus for mesh decoding includes processing circuitry configured to implement any of the described methods for mesh decoding.

Aspects of the disclosure also provide an apparatus for mesh encoding. The apparatus for mesh encoding includes processing circuitry configured to implement any of the described methods for mesh encoding.

Aspects of the disclosure also provide a non-transitory computer-readable medium storing instructions which, when executed by a computer, cause the computer to perform any of the described methods for mesh decoding/encoding/processing.

Technical solutions of the disclosure include methods and apparatuses for efficiently coding an attribute connectivity of polygon meshes, such as connections of texture coordinates and/or normals of the polygon meshes. In an example, a bitstream that includes coded information of a mesh with position vertices and non-position vertices is received. The coded information indicates whether a cut is applied to connections of the position vertices of the mesh. Whether is cut is applied is based on a comparison between a total number of the position vertices of the mesh and a total number of the non-position vertices of the mesh. The position vertices of the mesh are processed when the coded information indicates that the cut is applied to the connections of the position vertices of the mesh. The mesh is reconstructed based on whether the position vertices are processed. In the disclosure, based on the correspondence between the total number of the position vertices and the total number of the non-position vertices, coding efficiency of coding an attribute connectivity of a polygon mesh is improved.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
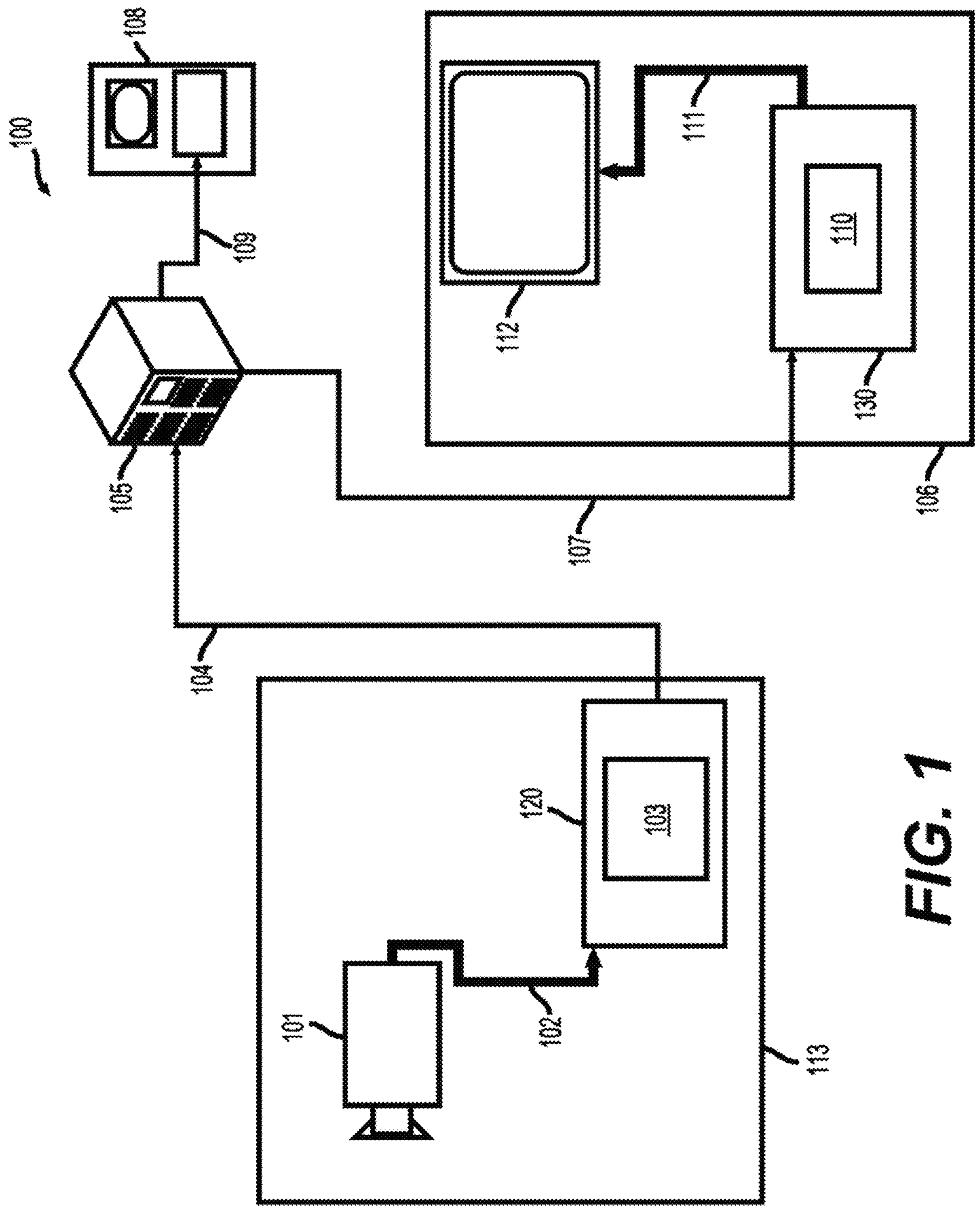
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (or mesh encoder) (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (or mesh decoder) (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
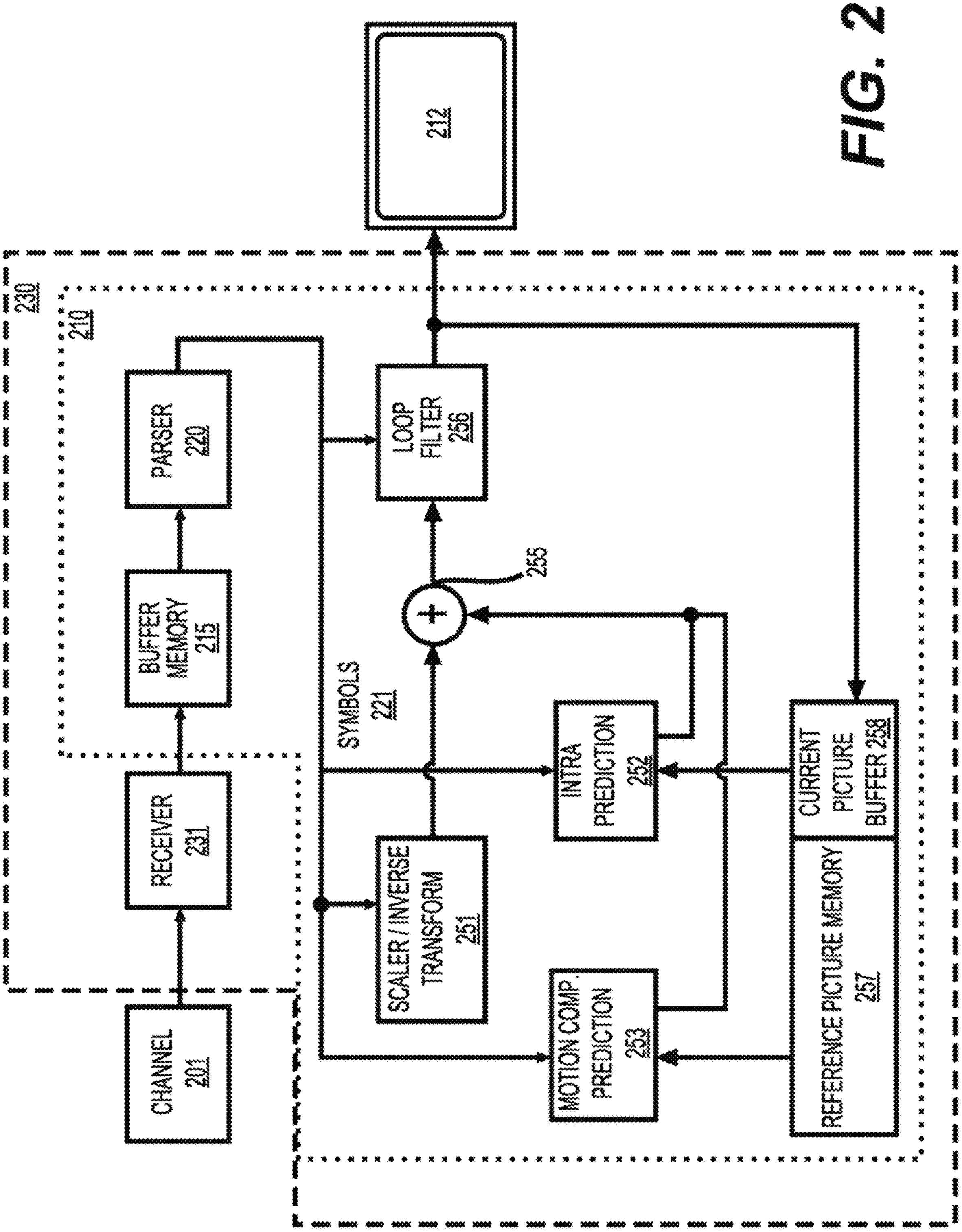
FIG. 2 is a schematic illustration of an example of a block diagram of a decoder.

FIG. 2 shows an example of a block diagram of a video decoder (or mesh decoder) (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
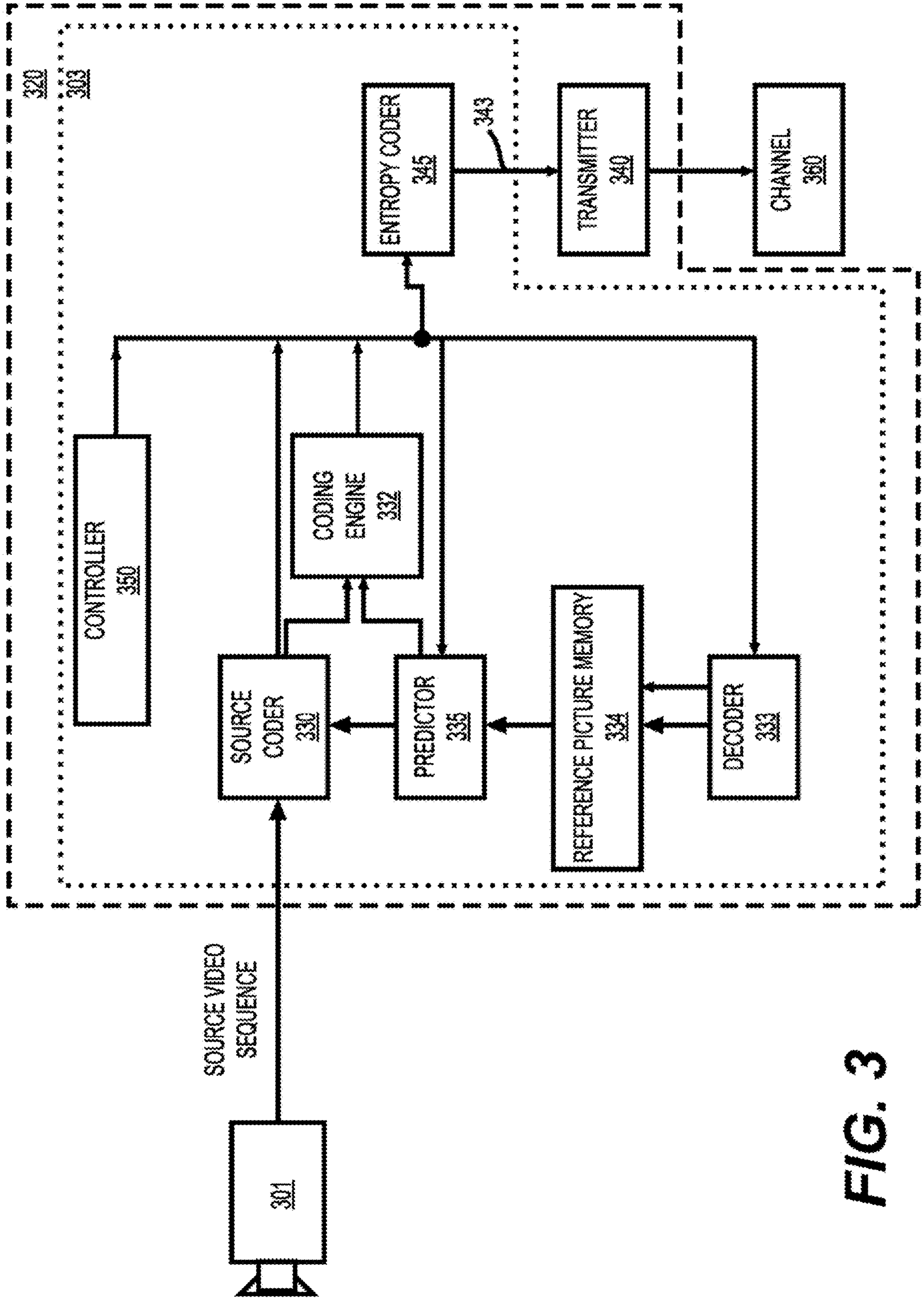
FIG. 3 is a schematic illustration of an example of a block diagram of an encoder.

FIG. 3 shows an example of a block diagram of a video encoder (or mesh encoder) (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels. Each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Aspects of the disclosure include methods and systems directed to efficiently coding attribute connectivity information of polygon meshes, such as coding connections of texture coordinates and normals of the polygon meshes.

Advances in three-dimensional (3D) capture, modeling, and rendering have promoted the ubiquitous presence of 3D contents across several platforms and devices. Nowadays, it is possible to capture a baby's first step in one continent and allow grandparents of the baby to see (or interact) and enjoy a full immersive experience with the child in another continent. Nevertheless, in order to achieve such realism, models are becoming ever more sophisticated, and a significant amount of data is linked to creation, storage, transmission and consumption of those models. 3D meshes are widely used to represent such immersive contents.

A mesh includes several polygons that describe a surface of a volumetric object. Each polygon is defined by its vertices in a 3D space and the information of how the vertices are connected, referred to as connectivity information. Vertex attributes, such as colors, normals, displacements, etc., may be associated with the mesh vertices. Attributes may also be associated with the surface of the mesh by exploiting mapping information that parameterizes the mesh with two-dimensional (2D) attribute maps. Such mapping may be described by a set of parametric coordinates, referred to as UV coordinates or texture coordinates, associated with the mesh vertices. 2D attribute maps may be used to store high resolution attribute information, such as texture, normals, displacements, etc. Such information may be used for various purposes, such as texture mapping, shading, mesh reconstruction, etc. In addition to vertices, attributes may also be associated with corners, edges, and/or faces of the mesh.

Figure 4:
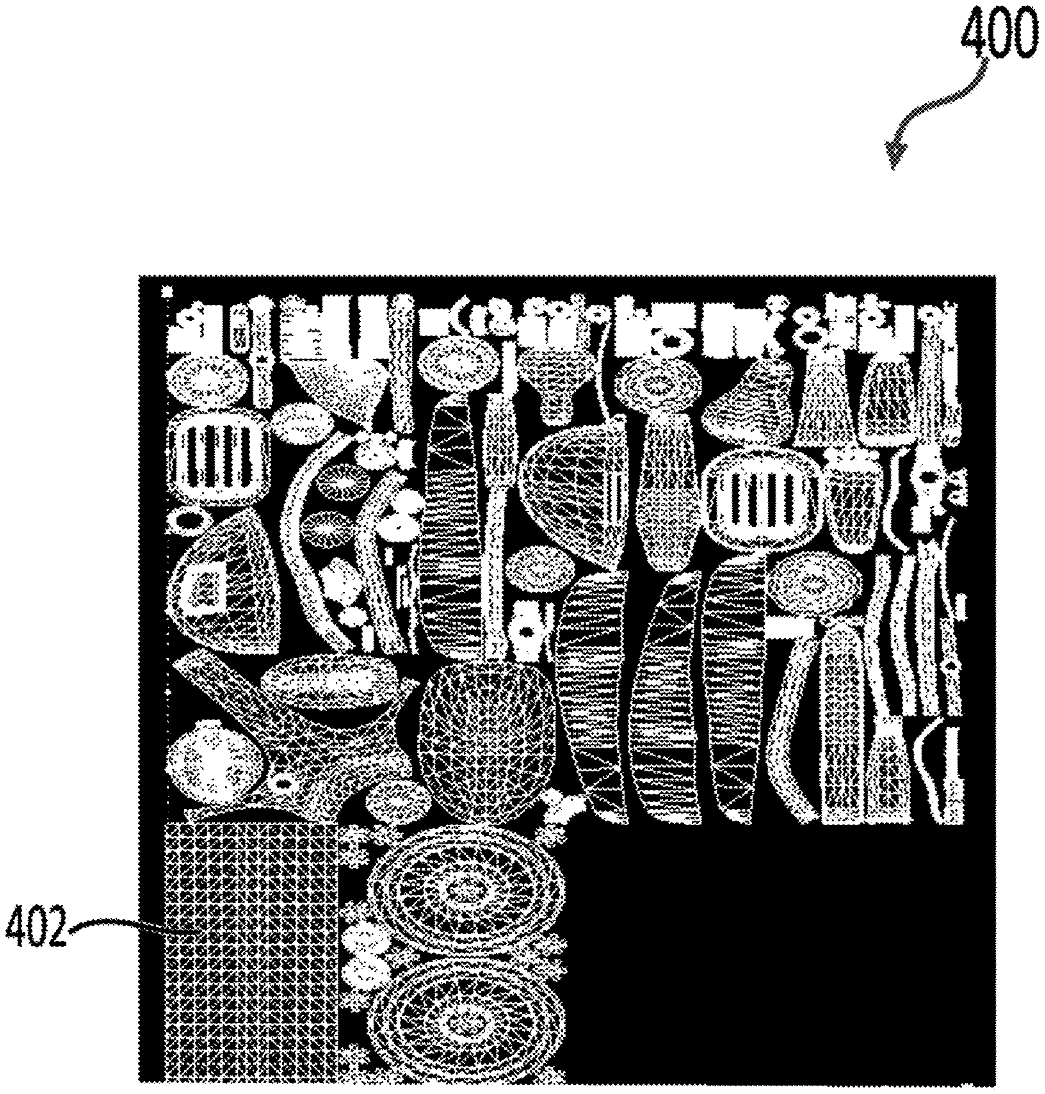
FIG. 4 is a schematic illustration of an example of texture/UV coordinates and UV connectivity.

When a polygon mesh contains non-position attributes, such as UV/texture coordinates, a mesh codec may need to encode connectivity information of those attributes, and several approaches may be applied. An example of texture/UV coordinates and the UV connectivity is shown in FIG. 4. As shown in FIG. 4, each connected component (e.g., (402)) of the UV coordinates is called a UV chart. In an example, connectivity of an attribute may be directly encoded as a separate mesh, and correspondence between corners of the attribute and 3D positions may be signaled. However, signaling the corner correspondence may require a large amount of bits, and redundancies between the position connectivity and the attribute connectivity can be significant. Thus, the direct approach to encode the attribute connectivity may be inefficient. Another approach is to signal seam edges. For example, one edge between two 3D vertices is split into two edges in the attribute space. In this way, signaling the corner correspondence may be avoided and the redundancies between the position connectivity and the attribute connectivity may be reduced by deducing the latter from the former and seam edges. However, signaling seam edges may also not efficient as the number of edges can be much larger than the number of vertices and faces.

Related approaches to encode the connectivity of polygon mesh attributes, such as connections of UV coordinate and normal, are inefficient. Accordingly, more efficient methods for coding the connectivity of mesh non-position attributes are desired.

In an aspect, for a polygon mesh, a correspondence between position vertices and non-position attribute vertices may be either a one-to-one mapping or a one-to-many mapping. That is, any non-position vertex may not be shared by different spatial vertices (or position vertices). In other words, the connectivity of non-position attribute may only be obtained by cutting the position connectivity, and no gluing of position vertices/edges are allowed.

A non-position vertex in a mesh may refer to vertex data that does not directly specify a 3D position in space. This data may include various attributes, such as (i) texture coordinates (UVs) that define how a texture image is mapped onto a surface of a mesh, (ii) vertex colors that specify a color of each vertex, (iii) normals that define a direction perpendicular to a surface at each vertex and may be used for lighting calculations, and (iv) tangents and bitangents that are used for advanced lighting techniques like normal mapping and parallax mapping. While these attributes are needed for rendering a realistic 3D model, the non-position vertices may not directly determine a geometric shape of the mesh. The position vertices, on the other hand, define actual 3D points that form the shape of the mesh.

Under the assumption (or condition) mentioned above, a total number of vertices of a non-position attribute (or non-position vertices associated with an attribute) may carry information about connectivity of the attribute. Since cutting may only increase the total number of vertices (e.g., the non-position vertices) compared to the position vertices, three scenarios (conditions) may be provided as follow.

In a first scenario, if a total number of vertices of a non-position attribute (or non-position vertices associated with an attribute) equals to a total number of position vertices, no cutting is applied on the position connectivity (or connections of the position vertices). Thus, a connectivity of the attribute (or connections of non-position vertices) and a connectivity of the position (or connections of position vertices) are the same.

In a second scenario, if a total number of vertices of a non-position attribute (or non-position vertices associated with an attribute) equals to a total face degree, cuttings are applied on every non-boundary edge of the position connectivity (or connections of the position vertices). Thus, all faces of the attribute (e.g., position attribute) are disconnected/isolated. In an example, the total face degree is a sum of a total number of vertices (e.g., position vertices) incident to each face. In an example, a vertex is incident to a face if the vertex is one of vertices that define a boundary of that face.

A third scenario is between the two extreme cases described above (e.g., no cuttings and cutting every edge). In the third scenario, how to cut the position connectivity (or connections of the position vertices) into the attribute connectivity (or connections of the non-position vertices) may be signaled.

Note that, the first two scenarios may not be mutually exclusive. If all faces in the position attribute (or position vertices) are already disconnected, no cutting is needed. Thus, the position attribute and the non-position attributes may have the same number of vertices, and the total number of the position vertices and the total number of the non-position vertices may be equal, such as equal to a total face degree (e.g., a sum of degrees of all faces in the mesh). Thus, the position attribute and non-position attributes share the same connectivity in which all faces are disconnected.

For the two extreme cases described above, the connectivity of a non-position attribute may be signaled. In an aspect, two bits may be applied to signal the connectivity of the non-position attribute. In an example, one bit indicates whether the first case (e.g., the position attribute and the non-position attribute have the same number of vertices) is true and the other bit indicates whether the second case (the number of vertices of the non-position attribute equals to the total face degree) is true.

In bitstream syntax designs, an alignment allocation may be applied to signal syntax elements. In some aspects, new syntax elements start at a beginning of a byte-aligned position in the bitstream. In some aspects, instead of using additional bytes to signal the connectivity of the two extreme cases mentioned above, two bits indicating the connectivity of the two extreme cases may be included, or hidden, in other signaled information by taking advantage of the byte-alignment arrangement. For example, when quantization bits of UV coordinates (denoted as QT) are to be signaled, the first 6 bits in a byte are applied to signal the QT value and the remaining 2 bits in that byte may be used to signal the connectivity of the two extreme cases. In this way, no additional bytes are required to signal the connectivity of a non-position attribute.

When the total number of vertices of a non-position attribute (or non-position vertices associated with an attribute) is slightly smaller than a total face degree, almost all edges are cut and almost all faces of the attribute are disconnected. Thus, information indicating that almost all faces are disconnected plus information indicating which one of the faces is connected may be signaled. For example, one bit is signaled to indicate that almost all faces are disconnected and indices (or index information) are signaled to indicate which of the faces is connected.

The connectivity coding methods mentioned above may be applied to encode attribute connectivity of each connected component independently. For example, if a connected component A (e.g., (402) in FIG. 4) has an attribute with connectivity matching scenario 1, while the same attribute of connected component B has connectivity matching scenario 2, the attribute connectivity of connected component A and the attribute connectivity of connected component B may be encoded independently, for example using the algorithm provided above.

Figure 5:
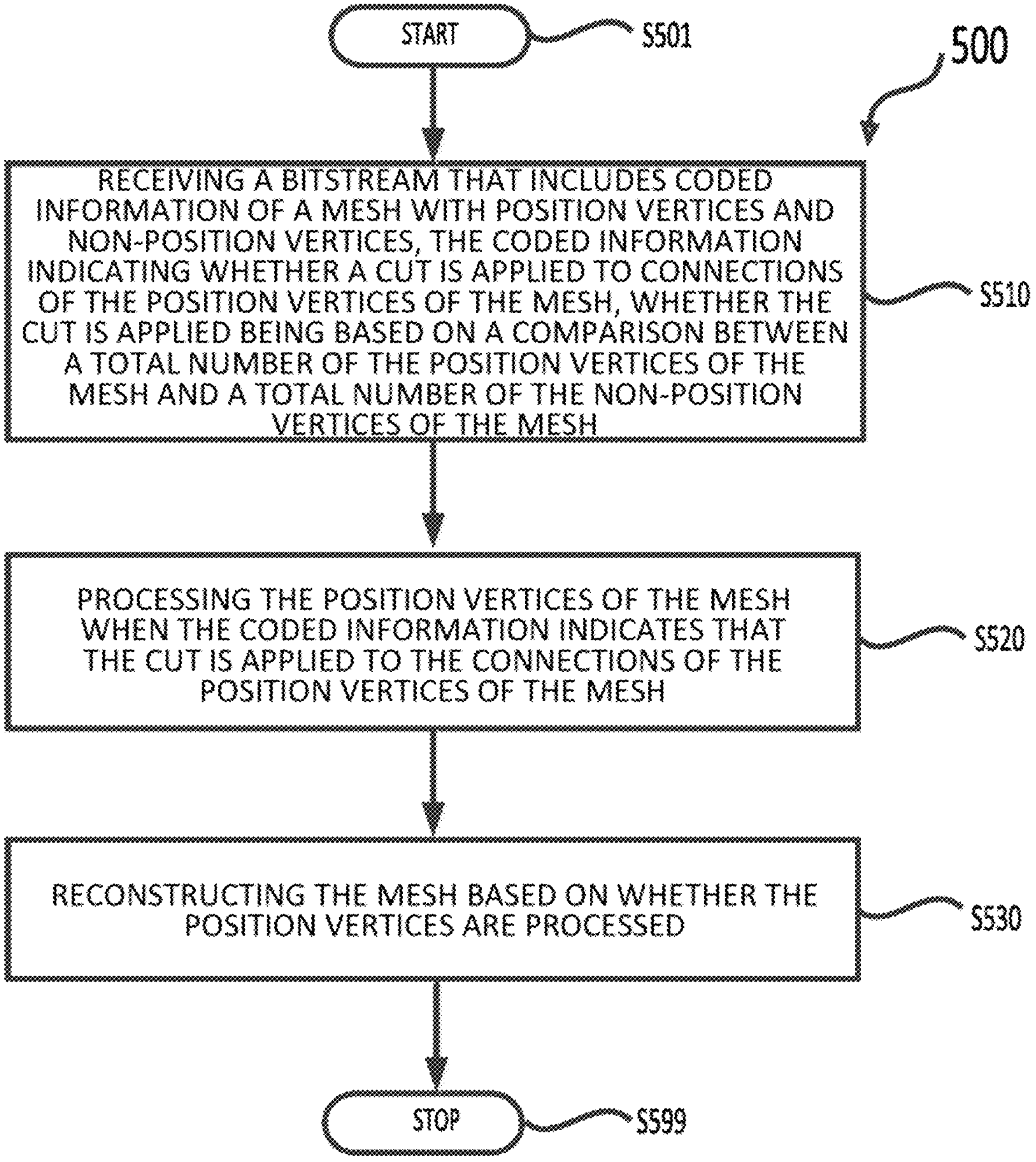
FIG. 5 shows a flow chart outlining a decoding process according to some aspects of the disclosure.

FIG. 5 shows a flow chart outlining a process (500) according to an aspect of the disclosure. The process (500) can be used in a mesh decoder. In various aspects, the process (500) is executed by processing circuitry, such as the processing circuitry that performs functions of the mesh decoder (110), the processing circuitry that performs functions of the mesh decoder (210), and the like. In some aspects, the process (500) is implemented in software instructions, thus when the processing circuitry executes the software instructions, the processing circuitry performs the process (500). The process starts at (S501) and proceeds to (S510).

At (S510), a bitstream that includes coded information of a mesh with position vertices and non-position vertices is received. The coded information indicates whether a cut is applied to connections of the position vertices of the mesh. Whether the cut is applied is based on a comparison between a total number of the position vertices of the mesh and a total number of the non-position vertices of the mesh.

At (S520), the position vertices of the mesh are processed when the coded information indicates that the cut is applied to the connections of the position vertices of the mesh.

At (S530), the mesh is reconstructed based on whether the position vertices are processed.

In an aspect, the coded information indicates that the cut is not applied to the connections of the position vertices of the mesh when the total number of the non-position vertices of the mesh is equal to the total number of the position vertices of the mesh.

In an aspect, the coded information indicates that the cut is applied to the connections of the position vertices of the mesh when the total number of the non-position vertices of the mesh is not equal to the total number of the position vertices of the mesh.

In an aspect, the coded information indicates that the cut is applied to the connections of the position vertices of the mesh when the total number of the non-position vertices of the mesh is equal to a total face degree of faces of the mesh. The total face degree indicates a sum of a total number of position vertices incident to at least one of the faces of the mesh.

In an aspect, each non-boundary edge of the mesh is cut when the coded information indicates that the total number of the non-position vertices of the mesh is equal to a total face degree of the mesh.

In an aspect, when the coded information indicates that the total number of the non-position vertices of the mesh is not equal to the total number of the position vertices of the mesh, one or more non-boundary edges of the mesh are cut according to index information included in the coded information.

In an aspect, the coded information includes (i) a first bit indicating whether the total number of the non-position vertices of the mesh is equal to the total number of the position vertices of the mesh, and (ii) a second bit indicating whether the total number of the non-position vertices of the mesh is equal to a total face degree of faces of the mesh.

In an aspect, the coded information includes a byte. The byte includes (i) six bits indicating a quantization bit of UV coordinates associated with the non-position vertices and (ii) two bits indicating whether the total number of the non-position vertices of the mesh is equal to the total number of the position vertices of the mesh and whether the total number of the non-position vertices of the mesh is equal to a total face degree of faces of the mesh.

In an aspect, when the total number of the non-position vertices of the mesh is less than a total face degree of faces of the mesh, the coded information includes a bit indicating which of a first group of the faces of the mesh is cut, and one or more indices indicating which one of the faces is not cut.

Then, the process proceeds to (S599) and terminates.

The process (500) can be suitably adapted. Step(s) in the process (500) can be modified and/or omitted. Additional step(s) can be added. Any suitable order of implementation can be used.

Figure 6:
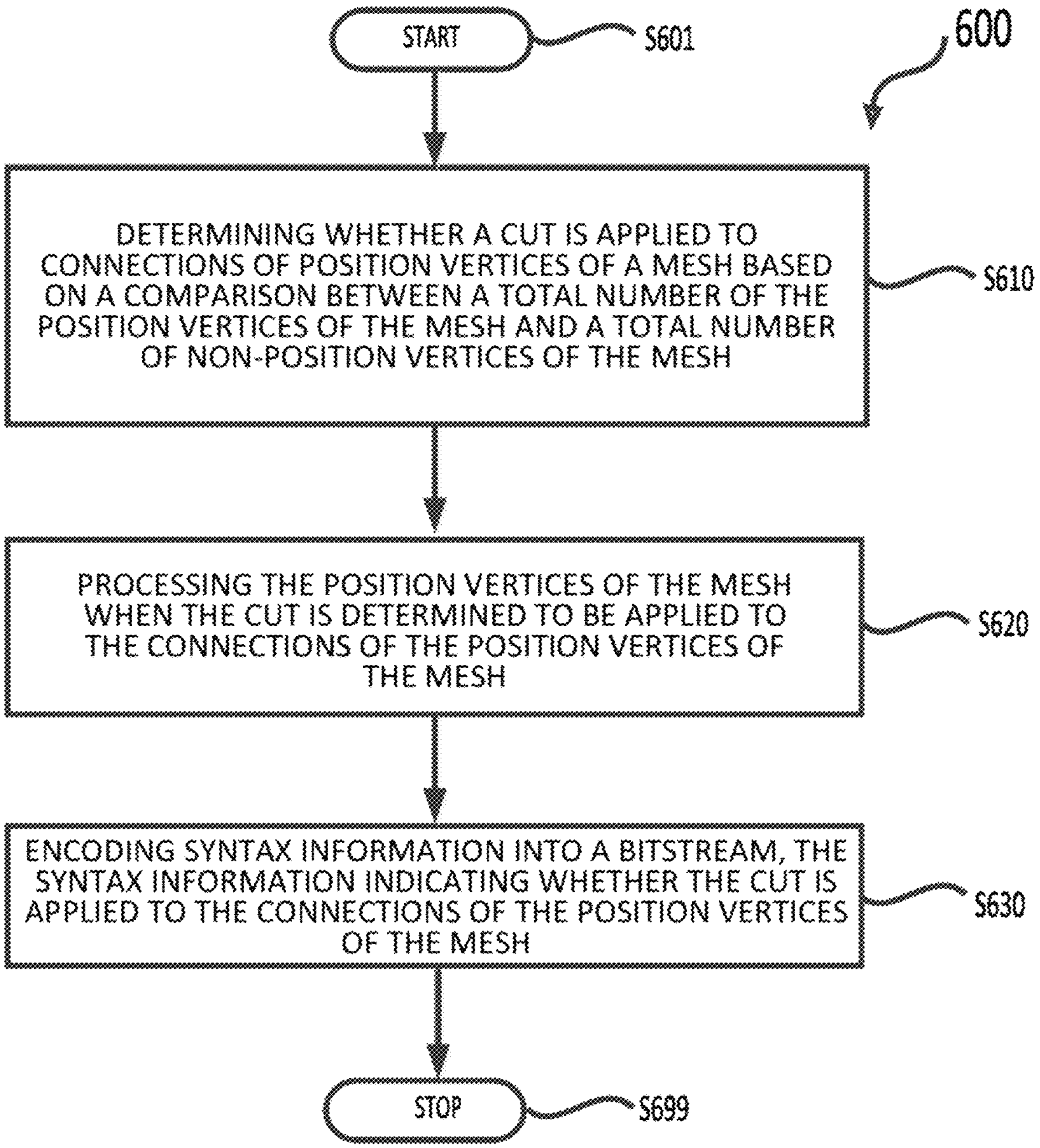
FIG. 6 shows a flow chart outlining an encoding process according to some aspects of the disclosure.

FIG. 6 shows a flow chart outlining a process (600) according to an aspect of the disclosure. The process (600) can be used in a video encoder. In various aspects, the process (600) is executed by processing circuitry, such as the processing circuitry that performs functions of the mesh encoder (103), the processing circuitry that performs functions of the mesh encoder (303), and the like. In some aspects, the process (600) is implemented in software instructions, thus when the processing circuitry executes the software instructions, the processing circuitry performs the process (600). The process starts at (S601) and proceeds to (S610).

At (S610), whether a cut is applied to connections of position vertices of a mesh is determined based on a comparison between a total number of the position vertices of the mesh and a total number of non-position vertices of the mesh.

At (S620), the position vertices of the mesh are processed when the cut is determined to be applied to the connections of the position vertices of the mesh.

At (S630), syntax information is encoded into a bitstream, where the syntax information indicates whether the cut is applied to the connections of the position vertices of the mesh.

In an aspect, the syntax information indicates that the cut is not applied to the connections of the position vertices of the mesh when the total number of the non-position vertices of the mesh is equal to the total number of the position vertices of the mesh.

In an aspect, the syntax information indicates that the cut is applied to the connections of the position vertices of the mesh when the total number of the non-position vertices of the mesh is not equal to the total number of the position vertices of the mesh.

In an aspect, syntax information indicates that the cut is applied to the connections of the position vertices of the mesh when the total number of the non-position vertices of the mesh is equal to a total face degree of faces of the mesh. The total face degree indicates a sum of a total number of position vertices incident to at least one of the faces of the mesh.

In an aspect, each non-boundary edge of the mesh is cut when the total number of the non-position vertices of the mesh is equal to a total face degree of the mesh.

In an aspect, one or more non-boundary edges of the mesh are cut when the total number of the non-position vertices of the mesh is not equal to the total number of the position vertices of the mesh.

In an aspect, the syntax information includes (i) a first bit indicating whether the total number of the non-position vertices of the mesh is equal to the total number of the position vertices of the mesh, and (ii) a second bit indicating whether the total number of the non-position vertices of the mesh is equal to a total face degree of faces of the mesh.

In an aspect, the syntax information includes a byte. The byte includes (i) six bits indicating a quantization bit of UV coordinates associated with the non-position vertices and (ii) two bits indicating whether the total number of the non-position vertices of the mesh is equal to the total number of the position vertices of the mesh and whether the total number of the non-position vertices of the mesh is equal to a total face degree of faces of the mesh.

In an aspect, when the total number of the non-position vertices of the mesh is less than a total face degree of faces of the mesh, the syntax information includes a bit indicating which of a first group of the faces of the mesh is cut, and one or more indices indicating which one of the faces is not cut.

Then, the process proceeds to (S699) and terminates.

The process (600) can be suitably adapted. Step(s) in the process (600) can be modified and/or omitted. Additional step(s) can be added. Any suitable order of implementation can be used.

In an aspect, a method of processing video data includes processing a bitstream of the mesh data according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

In an example, the bitstream includes coded information of a mesh with position vertices and non-position vertices. The coded information indicates whether a cut is applied to connections of the position vertices of the mesh. Whether the cut is applied is based on a comparison between a total number of the position vertices of the mesh and a total number of the non-position vertices of the mesh. The format rule specifies that the position vertices of the mesh are processed when the coded information indicating that the cut is applied to the connections of the position vertices of the mesh. The format rule specifies that the mesh is processed based on whether the position vertices are processed.

The techniques described above, can be implemented as computer software using computer-readable instructions and physically stored in one or more computer-readable media. For example, FIG. 7 shows a computer system (700) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
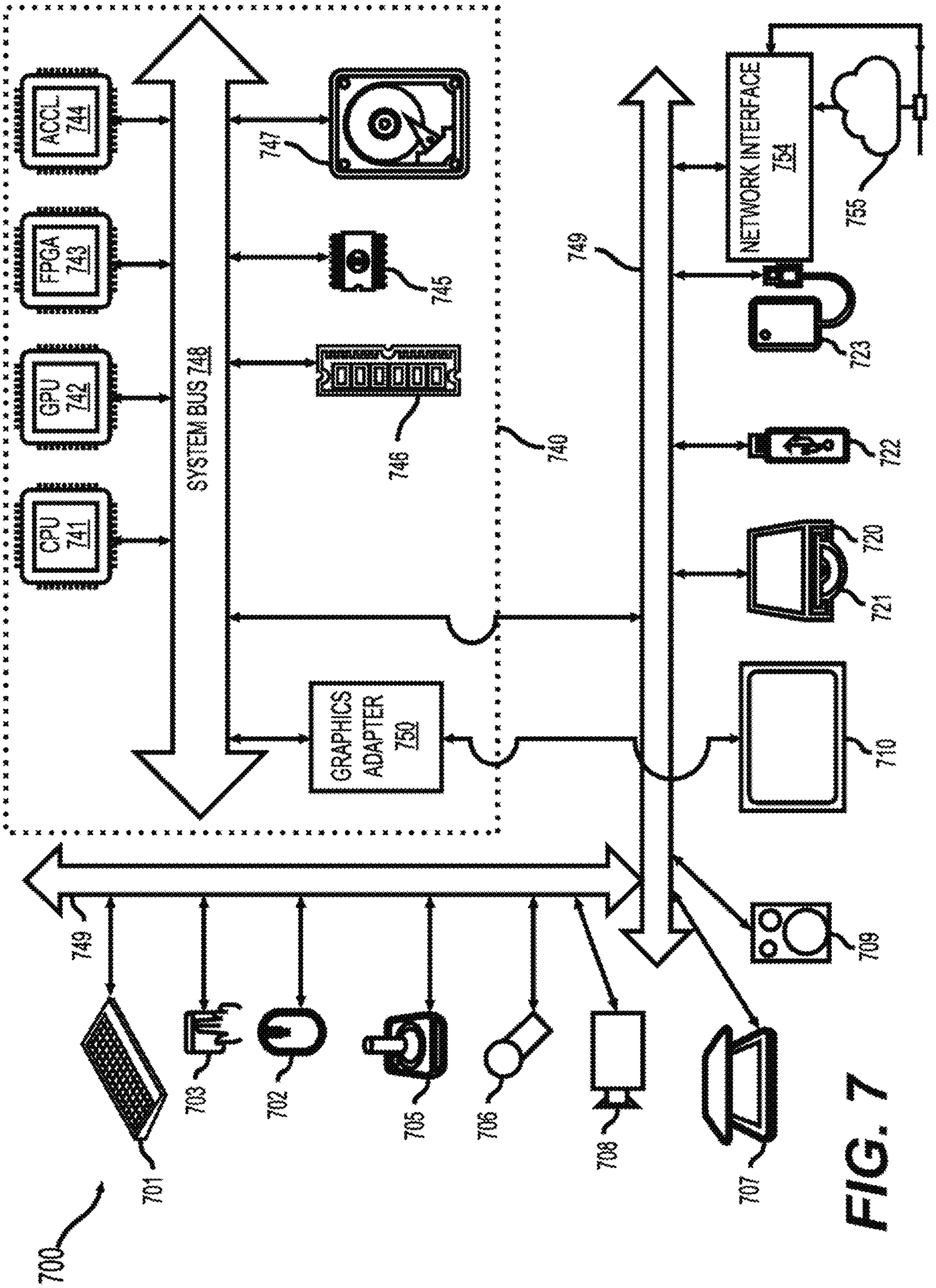
FIG. 7 is a schematic illustration of a computer system in accordance with an aspect.

The components shown in FIG. 7 for computer system (700) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (700) can also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) can also include an interface (754) to one or more communication networks (755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), graphics adapters (750), and so forth. These devices, along with Read-only memory (ROM) (745), Random-access memory (746), internal mass storage such as internal non-user accessible hard drives, SSDs, and the like (747), may be connected through a system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). In an example, the screen (710) can be connected to the graphics adapter (750). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can also be stored in RAM (746), whereas permanent data can be stored for example, in the internal mass storage (747). Fast storage and retrieve to any of the memory devices can be enabled through the use of cache memory, that can be closely associated with one or more CPU (741), GPU (742), mass storage (747), ROM (745), RAM (746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (700), and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various aspects of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to Care intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method of mesh decoding, including: receiving a bitstream that includes coded information of a mesh with position vertices and non-position vertices, the coded information indicating whether a cut is applied to connections of the position vertices of the mesh, whether the cut is applied being based on a comparison between a total number of the position vertices of the mesh and a total number of the non-position vertices of the mesh; processing the position vertices of the mesh when the coded information indicates that the cut is applied to the connections of the position vertices of the mesh; and reconstructing the mesh based on whether the position vertices are processed.

(2) The method of feature (1), in which the coded information indicates that the cut is not applied to the connections of the position vertices of the mesh when the total number of the non-position vertices of the mesh is equal to the total number of the position vertices of the mesh.

(3) The method of any of features (1) to (2), in which the coded information indicates that the cut is applied to the connections of the position vertices of the mesh when the total number of the non-position vertices of the mesh is not equal to the total number of the position vertices of the mesh.

(4) The method of any of features (1) to (3), in which the coded information indicates that the cut is applied to the connections of the position vertices of the mesh when the total number of the non-position vertices of the mesh is equal to a total face degree of faces of the mesh, the total face degree indicating a sum of a total number of position vertices incident to at least one of the faces of the mesh.

(5) The method of any of features (1) to (4), in which the processing further includes: cutting each non-boundary edge of the mesh when the coded information indicates that the total number of the non-position vertices of the mesh is equal to a total face degree of the mesh.

(6) The method of any of features (1) to (5), in which the processing further includes: when the coded information indicates that the total number of the non-position vertices of the mesh is not equal to the total number of the position vertices of the mesh, cutting one or more non-boundary edges of the mesh according to index information included in the coded information.

(7) The method of any of features (1) to (6), in which the coded information includes: a first bit indicating whether the total number of the non-position vertices of the mesh is equal to the total number of the position vertices of the mesh, and a second bit indicating whether the total number of the non-position vertices of the mesh is equal to a total face degree of faces of the mesh.

(8) The method of any of features (1) to (7), in which the coded information includes a byte, the byte including (i) six bits indicating a quantization bit of UV coordinates associated with the non-position vertices and (ii) two bits indicating whether the total number of the non-position vertices of the mesh is equal to the total number of the position vertices of the mesh and whether the total number of the non-position vertices of the mesh is equal to a total face degree of faces of the mesh.

(9) The method of any of features (1) to (8), in which: when the total number of the non-position vertices of the mesh is less than a total face degree of faces of the mesh, the coded information includes: a bit indicating which of a first group of the faces of the mesh is cut, and one or more indices indicating which one of the faces is not cut.

(10) A method of mesh encoding, including: determining whether a cut is applied to connections of position vertices of a mesh based on a comparison between a total number of the position vertices of the mesh and a total number of non-position vertices of the mesh; processing the position vertices of the mesh when the cut is determined to be applied to the connections of the position vertices of the mesh; and encoding syntax information into a bitstream, the syntax information indicating whether the cut is applied to the connections of the position vertices of the mesh.

(11) The method of feature (10), in which the syntax information indicates that the cut is not applied to the connections of the position vertices of the mesh when the total number of the non-position vertices of the mesh is equal to the total number of the position vertices of the mesh.

(12) The method of any of features (10) to (11), in which the syntax information indicates that the cut is applied to the connections of the position vertices of the mesh when the total number of the non-position vertices of the mesh is not equal to the total number of the position vertices of the mesh.

(13) The method of any of features (10) to (12), in which the syntax information indicates that the cut is applied to the connections of the position vertices of the mesh when the total number of the non-position vertices of the mesh is equal to a total face degree of faces of the mesh, the total face degree indicating a sum of a total number of position vertices incident to at least one of the faces of the mesh.

(14) The method of any of features (10) to (13), in which the processing further includes: cutting each non-boundary edge of the mesh when the total number of the non-position vertices of the mesh is equal to a total face degree of the mesh.

(15) The method of any of features (10) to (14), in which the processing further includes: cutting one or more non-boundary edges of the mesh when the total number of the non-position vertices of the mesh is not equal to the total number of the position vertices of the mesh.

(16) The method of any of features (10) to (15), in which the syntax information includes: a first bit indicating whether the total number of the non-position vertices of the mesh is equal to the total number of the position vertices of the mesh, and a second bit indicating whether the total number of the non-position vertices of the mesh is equal to a total face degree of faces of the mesh.

(17) The method of any of features (10) to (16), in which the syntax information includes a byte, the byte including (i) six bits indicating a quantization bit of UV coordinates associated with the non-position vertices and (ii) two bits indicating whether the total number of the non-position vertices of the mesh is equal to the total number of the position vertices of the mesh and whether the total number of the non-position vertices of the mesh is equal to a total face degree of faces of the mesh.

(18) The method of any of features (10) to (17), in which: when the total number of the non-position vertices of the mesh is less than a total face degree of faces of the mesh, the syntax information includes: a bit indicating which of a first group of the faces of the mesh is cut, and one or more indices indicating which one of the faces is not cut.

(19) A method of processing mesh data, the method including: processing a bitstream of the mesh data according to a format rule, in which: the bitstream include coded information of a mesh with position vertices and non-position vertices, the coded information indicating whether a cut is applied to connections of the position vertices of the mesh, whether the cut is applied being based on a comparison between a total number of the position vertices of the mesh and a total number of the non-position vertices of the mesh; and the format rule specifies that: the position vertices of the mesh are processed when the coded information indicates that the cut is applied to the connections of the position vertices of the mesh; and the mesh is processed based on whether the position vertices are processed.

(20) The method of feature (19), in which the coded information indicates the cut is not applied to the connections of the position vertices of the mesh when the total number of the non-position vertices of the mesh is equal to the total number of the position vertices of the mesh.

(21) An apparatus for mesh decoding, including processing circuitry that is configured to perform the method of any of features (1) to (9).

(22) An apparatus for mesh encoding, including processing circuitry that is configured to perform the method of any of features (10) to (18).

(23) A non-transitory computer-readable storage medium storing instructions which when executed by at least one processor cause the at least one processor to perform the method of any of features (1) to (18).

What is claimed is:

1. A method of mesh decoding, the method comprising:

receiving a bitstream that includes coded information of a mesh with position vertices and non-position vertices, the coded information indicating whether a cut is applied to connections of the position vertices of the mesh, whether the cut is applied being based on a comparison between a total number of the position vertices of the mesh and a total number of the non-position vertices of the mesh;

processing the position vertices of the mesh when the coded information indicates that the cut is applied to the connections of the position vertices of the mesh; and reconstructing the mesh based on whether the position vertices are processed.

2. The method of claim 1, wherein the coded information indicates that the cut is not applied to the connections of the position vertices of the mesh when the total number of the non-position vertices of the mesh is equal to the total number of the position vertices of the mesh.

3. The method of claim 1, wherein the coded information indicates that the cut is applied to the connections of the position vertices of the mesh when the total number of the non-position vertices of the mesh is not equal to the total number of the position vertices of the mesh.

4. The method of claim 1, wherein the coded information indicates that the cut is applied to the connections of the position vertices of the mesh when the total number of the non-position vertices of the mesh is equal to a total face degree of faces of the mesh, the total face degree indicating a sum of a total number of position vertices incident to at least one of the faces of the mesh.

5. The method of claim 1, wherein the processing further comprises:

cutting each non-boundary edge of the mesh when the coded information indicates that the total number of the non-position vertices of the mesh is equal to a total face degree of the mesh.

6. The method of claim 1, wherein the processing further comprises:

when the coded information indicates that the total number of the non-position vertices of the mesh is not equal to the total number of the position vertices of the mesh, cutting one or more non-boundary edges of the mesh according to index information included in the coded information.

7. The method of claim 1, wherein the coded information includes:

a first bit indicating whether the total number of the non-position vertices of the mesh is equal to the total number of the position vertices of the mesh, and a second bit indicating whether the total number of the non-position vertices of the mesh is equal to a total face degree of faces of the mesh.

8. The method of claim 1, wherein the coded information includes a byte, the byte including (i) six bits indicating a quantization bit of UV coordinates associated with the non-position vertices and (ii) two bits indicating whether the total number of the non-position vertices of the mesh is equal to the total number of the position vertices of the mesh and whether the total number of the non-position vertices of the mesh is equal to a total face degree of faces of the mesh.

9. The method of claim 1, wherein:

when the total number of the non-position vertices of the mesh is less than a total face degree of faces of the mesh, the coded information includes:

a bit indicating which of a first group of the faces of the mesh is cut, and one or more indices indicating which one of the faces is not cut.

10. A method of mesh encoding, the method comprising:

determining whether a cut is applied to connections of position vertices of a mesh based on a comparison between a total number of the position vertices of the mesh and a total number of non-position vertices of the mesh;

processing the position vertices of the mesh when the cut is determined to be applied to the connections of the position vertices of the mesh; and encoding syntax information into a bitstream, the syntax information indicating whether the cut is applied to the connections of the position vertices of the mesh.

11. The method of claim 10, wherein the syntax information indicates that the cut is not applied to the connections of the position vertices of the mesh when the total number of the non-position vertices of the mesh is equal to the total number of the position vertices of the mesh.

12. The method of claim 10, wherein the syntax information indicates that the cut is applied to the connections of the position vertices of the mesh when the total number of the non-position vertices of the mesh is not equal to the total number of the position vertices of the mesh.

13. The method of claim 10, wherein the syntax information indicates that the cut is applied to the connections of the position vertices of the mesh when the total number of the non-position vertices of the mesh is equal to a total face degree of faces of the mesh, the total face degree indicating a sum of a total number of position vertices incident to at least one of the faces of the mesh.

14. The method of claim 10, wherein the processing further comprises:

cutting each non-boundary edge of the mesh when the total number of the non-position vertices of the mesh is equal to a total face degree of the mesh.

15. The method of claim 10, wherein the processing further comprises:

cutting one or more non-boundary edges of the mesh when the total number of the non-position vertices of the mesh is not equal to the total number of the position vertices of the mesh.

16. The method of claim 10, wherein the syntax information includes:

a first bit indicating whether the total number of the non-position vertices of the mesh is equal to the total number of the position vertices of the mesh, and a second bit indicating whether the total number of the non-position vertices of the mesh is equal to a total face degree of faces of the mesh.

17. The method of claim 10, wherein the syntax information includes a byte, the byte including (i) six bits indicating a quantization bit of UV coordinates associated with the non-position vertices and (ii) two bits indicating whether the total number of the non-position vertices of the mesh is equal to the total number of the position vertices of the mesh and whether the total number of the non-position vertices of the mesh is equal to a total face degree of faces of the mesh.

18. The method of claim 10, wherein:

when the total number of the non-position vertices of the mesh is less than a total face degree of faces of the mesh, the syntax information includes:

a bit indicating which of a first group of the faces of the mesh is cut, and one or more indices indicating which one of the faces is not cut.

19. A method of processing mesh data, the method comprising:

processing a bitstream of the mesh data according to a format rule, wherein:

the bitstream includes coded information of a mesh with position vertices and non-position vertices, the coded information indicating whether a cut is applied to connections of the position vertices of the mesh, whether the cut is applied being based on a comparison between a total number of the position vertices of the mesh and a total number of the non-position vertices of the mesh; and the format rule specifies that:

the position vertices of the mesh are processed when the coded information indicates that the cut is applied to the connections of the position vertices of the mesh; and the mesh is processed based on whether the position vertices are processed.

20. The method of claim 19, wherein the coded information indicates the cut is not applied to the connections of the position vertices of the mesh when the total number of the non-position vertices of the mesh is equal to the total number of the position vertices of the mesh.

* * * * *